United States Patent [19]

Chapman et al.

[11] Patent Number: 5,731,054
[45] Date of Patent: Mar. 24, 1998

[54] MIXTURES OF LOW K METALLIZED FORMAZAN DYES WITH SYMMETRICAL AND UNSYMMETRICAL CYANINE DYES

[75] Inventors: Derek David Chapman; Michael Paul Cunningham, both of Rochester; Ramanuj Goswami, Webster, all of N.Y.

[73] Assignee: Eastman Kodak Company, Rochester, N.Y.

[21] Appl. No.: 731,475

[22] Filed: Oct. 16, 1996

[51] Int. Cl.$^6$ ............................................. B32B 3/00
[52] U.S. Cl. ..................... 428/64.1; 428/64.2; 428/64.4; 428/64.8; 428/457; 428/913; 430/270.14; 430/495.1; 430/945; 369/283; 369/288
[58] Field of Search .......................... 428/64.1, 64.2, 428/64.4, 64.8, 457, 913; 430/270.1, 270.11, 270.14, 495.1, 945; 369/283, 288

[56] References Cited

U.S. PATENT DOCUMENTS

| | | | |
|---|---|---|---|
| 5,294,471 | 3/1994 | Evans et al. | 428/64.1 |
| 5,391,413 | 2/1995 | Yanagisawa et al. | 428/64.1 |
| 5,426,015 | 6/1995 | Chapman et al. | 428/64.1 |
| 5,500,325 | 3/1996 | Chapman et al. | 428/64.1 |
| 5,547,728 | 8/1996 | Cunningham et al. | 428/64.1 |

*Primary Examiner*—Patrick Ryan
*Assistant Examiner*—Elizabeth Evans
*Attorney, Agent, or Firm*—John R. Everett

[57] ABSTRACT

A mixture of low k metallized formazan dye with symmetrical and unsymmetrical cyanine dyes is disclosed. The mixture is useful in optical recording layers of optical recording elements.

23 Claims, No Drawings

MIXTURES OF LOW K METALLIZED FORMAZAN DYES WITH SYMMETRICAL AND UNSYMMETRICAL CYANINE DYES

FIELD OF THE INVENTION

The present invention relates to optical recording elements, including recordable optical compact disks.

BACKGROUND OF THE INVENTION

There are many known types of optical recording elements. One of the currently popular elements is the compact disk (CD). Digital information is stored in the form of high optical density marks or pits on an otherwise reflective background. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the optical density is higher than in those areas not having the deformations.

It is desirable to produce recordable optical recording elements which, when recorded in real time, produce a record that mimics the conventional CD on read out. Read out is at about 780 nm. In this manner, information can be added to the CD and the CD can be used on a conventional CD player.

One element of this type is the so called "Photo CD". In the system in which this element is used, conventional photographic film is first processed in a conventional manner. Then, the images from the film are digitized and the digital information is recorded in a CD readable form on the optical recording element (Photo CD). Images can then be played back on a CD-type player into a conventional television. Since the element has a capacity for a number of digitized images that is greater than the number of images on a typical roll of consumer film, it is anticipated that the user will want to add images to a preexisting CD.

These recordable optical recording elements consist of a polycarbonate substrate containing a continuous tracking groove. An organic dye layer (recording layer) is solvent coated onto the grooved substrate. Fabrication is completed by coating a reflector layer, a protective layer, and a label in a fashion similar to a conventional CD digital audio disc or CD-ROM disc. In the recordable element the digital information is written into the dye layer with the focused beam of a diode laser operating in the near infrared region of the spectrum.

Commercially useful recordable optical recording elements have stringent requirements. The recording layer must have the required reflectivity, and must also be able to couple with incident laser irradiation to provide features having adequate optical contrast. The layer must also have good stability towards light, heat and humidity for acceptable shelf life. Since the Photo CD is a consumer product, it must be capable of withstanding extreme environments. Between the time the original images are recorded on the Photo CD element and the time subsequent images are recorded, the element might be placed in strong sunlight.

In addition the optical properties of the recording layer (its' refractive indices) must be finely tuned especially as regards 'k' (the imaginary component of the index of refraction) which controls the absorption of light at the writing laser wavelength. K must be finite but low to insure a balance between coupling and reflectivity.

Experimentally, it is difficult to find a single dye with the appropriate value of k. It is common in the art to combine symmetrical cyanine dyes (usually at least two dyes, one with a high k and one with a low k) to meet the k requirements. See U.S. Pat. No. 5,391,413. Indodicarbocyanine dyes have been used frequently. However, these dyes often have less than the desired light stability and will in fact fade to an unusable state after only a few days of intense sunlight exposure.

Optical recording layers containing metallized formazan dyes are disclosed in U.S. Pat. No. 5,294,471. These recording layers do not have sufficient capability to couple with incident laser irradiation to form the necessary contrast and sensitivity.

U.S. Pat. No. 5,547,728 discloses optical recording elements having recording layers comprising a mixture of metallized formazan dye and a cyanine dye. Such elements are useful but need improvements in recording sensitivity, incubation stability and light stability. Most of the expressly disclosed metallized formazans therein have a strong electron withdrawing group (typically $NO_2$). This results in a relatively large absorption at 780 nm. As a result, those formazans have, as part of their complex refractive index high k values (about 0.15). This relatively large k value has a negative impact on reflectivity when used with other recording layer dyes also having high k values.

Thus, there is a continuing need for optical recording materials that have the necessary optical characteristics such that they are CD compatible, can couple with incident laser irradiation to form features with sufficient contrast and yet are light and dark (incubation) stable.

SUMMARY OF THE INVENTION

In accordance with the present invention there is provided a mixture of (a) metallized formazan dye and (b) a mixture of cyanine dyes wherein the metallized formazan dye has an imaginary k value of 0.03 to 0.07 and the mixture of cyanine dyes is a mixture of symmetrical and unsymmetrical cyanine dyes.

The present invention also provides an optical recording element having a transparent substrate and on the surface of said substrate, a recording layer and a light reflecting layer wherein recording layer comprises a mixture of (a) metallized formazan dye and (b) a mixture of cyanine dyes, and the unrecorded layer is such that the real part of the refractive at 780 nm is greater than 1.8 and the imaginary part is less than 0.15 wherein the metallized formazan dye has a k value of 0.03 to 0.07 and the mixture of cyanine dyes is a mixture of symmetrical and unsymmetrical cyanine dyes.

For convenience the metalized formazan dyes used in this invention are sometimes referred herein as "low k" formazans.

The mixtures of the invention comprise a high k symmetrical cyanine dye such as CD-1 (k=0.09) and a low k unsymmetrical cyanine dye such as U-2 (k=0.02). The desired optical properties are obtained by adjusting the component ratios of the cyanine dyes. The low k formazan component affords light stability. The unobvious advantage that follows from the use of this mixture in forming optical recording layers is the unusual incubation stability which is not seen with the usual low k symmetrical cyanine (CD-2 is typical) employed in the prior art.

Optical recording elements have improved incubation stability and light stability compared to the above cited prior art elements. The use of low k metallized formazans defined above allows the use of greater concentrations of metalized formazans without adversely affecting the targeted k value for the recording layer.

DETAILED DESCRIPTION OF THE INVENTION

The low k formazans used herein are prepared according to the methods described in U.S. Pat. No. 5,294,471. Low k metallized formazans include, but are not limited to, those having the structure (I):

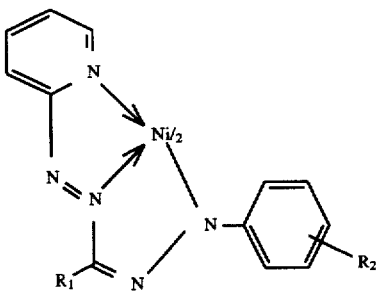

wherein $R_1$ represents alkyl of 1–12 carbons, or alkyl substituted with one or more groups selected from the group consisting of hydroxy, acyloxy, alkoxy, aryloxy, alkylthio, arylthio, alkylsulfonyl, arylsulfonyl, thiocyano, cyano, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, trihalomethyl, alkyl, heteroaryl, alkylureido, arylureido, succinimido and phthalimido; or aryl, or alkyl substituted aryl, or alkoxy substituted aryl; and $R_2$ represents sulfonyl morpholine, sulfonamide, halogen, cyano, alkoxycarbonyl or alkyl sulfonyl.

In the definitions of structure I alkyl means 1–12 carbons (including cycloalkyl of 5–7 carbons), aryl means 6–10 carbon atoms, alkoxy means 1–12 carbons and heteroaryl means 5–10 membered unsaturated rings with at least one heteroatom.

In addition, each of the alkyl, cycloalkyl, aryl, heteroaryl and alkoxy groups may be further substituted with one or more groups chosen from hydroxy, acyloxy, alkoxy, aryloxy, alkylthio, arylthio, alkylsulfonyl, arylsulfonyl, thiocyano, cyano, nitro, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, trihalomethyl, alkyl, aryl, heteroaryl, alkylureido, arylureido, succinimido, phthalimido and the like.

Examples of representative dyes falling within structure I are presented in Table 1.

TABLE 1

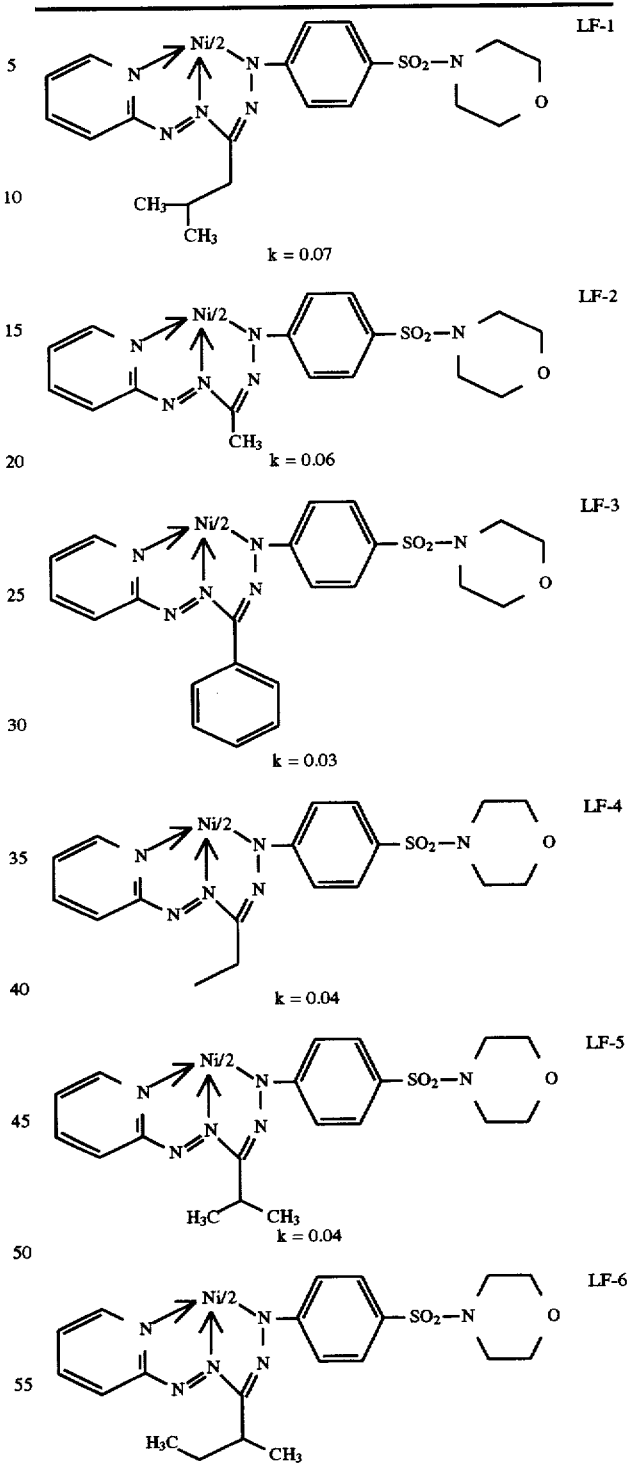

TABLE 1-continued

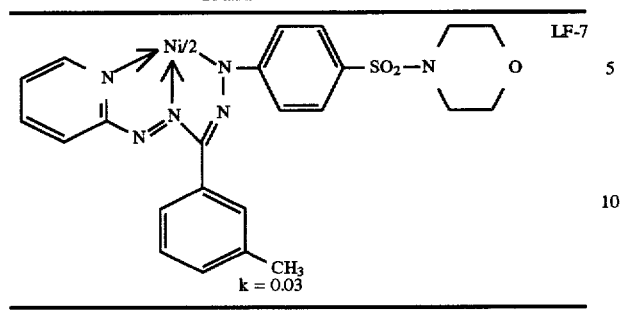

Any cyanine dye should be useful in the recording layer mixture as long as the resulting mixture has the refractive index attributes mentioned above. A particularly useful group of such dyes are indodicarbocyanine dyes. Typical indodicarbocyanine dyes include those of structure II (symmetrical) and III (unsymmetrical):

wherein $R_1$, $R_2$, $R_3$ and $R_4$ represents substituted and unsubstituted alkyl of 1–12 carbon atoms, wherein substituents are selected from the group consisting of hydroxy, acyloxy, alkoxy, aryloxy, alkylthio, arylthio, alkylsulfonyl, arylsulfonyl, thiocyano, cyano, nitro, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, trihalomethyl, alkyl, aryl, heteroaryl, alkylureido, arylureido, succinimido and phthalimido; and X represents $ClO_4$ or $BF_4$.

Typical symmetrical cyanine dyes have the following structures:

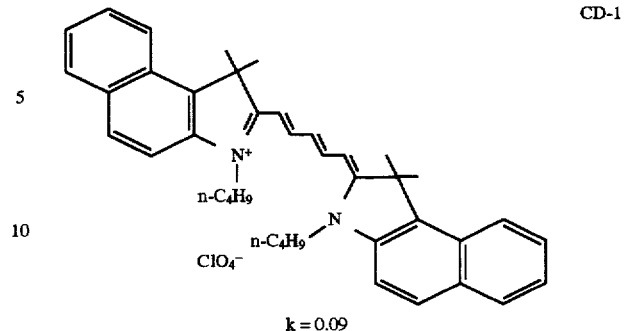

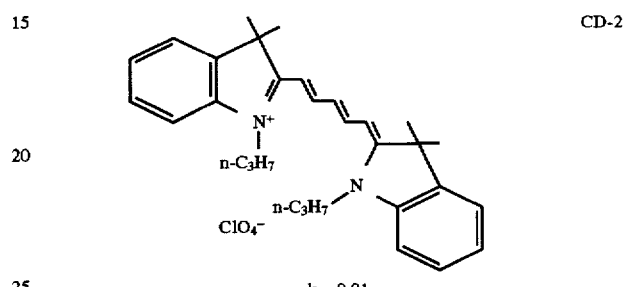

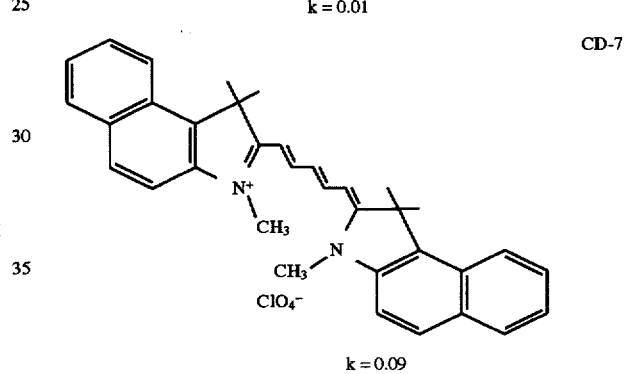

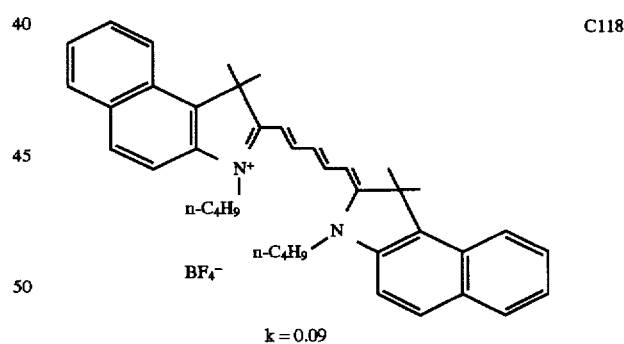

Typical unsymmetrical cyanines are presented in Table 2:

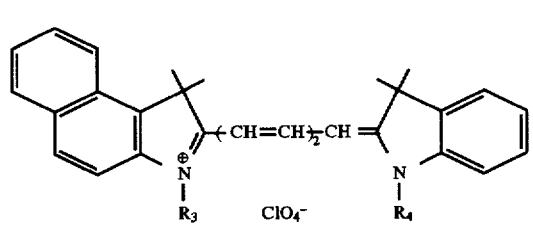

TABLE 2

| Dye No. | $R_3$ | $R_4$ |
| --- | --- | --- |
| U-1 k = 0.02 | n-$C_4H_9$ | —$CH_3$ |
| U-2 k = 0.02 | n-$C_4H_9$ | —$CH_2CH_2CH_3$ |
| U-3 | n-$C_4H_9$ | —$CH_2CH_2CH_2CH_3$ |

Optical Recording Elements

The optical elements of the invention comprise a light transmitting, typically pregrooved substrate, a dye recording layer overlaying the substrate, a light reflective layer overlaying the light absorptive layer and a protective layer overlaying the light reflective layer. The recording process will produce marks of lower reflectivity than the unmarked areas of the disk when written and read with a diode laser emitting between 770 and 800 nm. The substituents on the dye molecules are selected such that the real part of the complex refractive index (n) of the unwritten recording layer measured with a 780 nm light source is greater than 1.8 and the imaginary part (k) is less than 0.15.

The substrate may be any transparent material that satisfies the mechanical and optical requirements. The substrates are generally pregrooved with groove depths from 20 nm to 250 nm, groove widths 0.2 to 1 µm and a pitch 0.5 to 2 µm. The preferred material is polycarbonate, other materials are glass, polymethylmethacrylate and other suitable polymeric materials.

The preparation of the optical recording element of the invention is achieved by spin coating of the dye mixture, with or without addenda, from a suitable solvent onto a transparent substrate. For coating, the dye mixture, with or without addenda, is dissolved in a suitable solvent such that the dye is 20 or less parts by weight to 100 parts of solvent by volume. The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include alcohols, hydrocarbon halides, cellosolves, ketones. Examples of solvents are 2,2,3,3-tetrafluoropropanol, tetrachloroethane, dichloromethane, methyl cellosolve, ethyl cellosolve, 1-methoxy-2-propanol, 4-hydroxy-4-methyl-2-pentanone. Preferred solvents are alcohols since they have the least effect on the preferred polycarbonate substrates. Mixtures containing these solvents can also be used.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminum, copper and alloys thereof.

The protective layer over the reflective layer is similarly conventional for this art. Useful materials include UV curable acrylates.

One preferred protective layer is disclosed in U.S. Pat. No. 5,312,663. This patent discloses a two layer structure in which the layer adjacent to the reflective layer is spin coated and the second layer is screen printed.

An intermediate layer, to protect the metal layer from oxidation, can also be present.

The element of the invention can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

Representative metallized formazans from Table 1 were combined with a mixture of cyanine dyes (symmetrical and unsymmetrical) to form optical recording layers and optical recording elements. For each of the recording layer mixtures studied, the cyanine dye mixture to formazan ratio was varied so as to form an element capable of achieving the required refractive indices, the aim being to meet the 70% minimum reflectivity for optical data discs published in *International Standard* ISO/IEC 10149. The combined formazan cyanine dye mixture was dissolved in an appropriate solvent (typically 2,2,3,3-tetrafluoro-1-propanol (TFP)) and spun coated onto silicon wafers. Spectroscopic ellipsometric analysis of the coated wafers provided the refractive index. The film thickness corresponding to the first reflective maximum and the reflectivity was calculated. The ratio of components was varied until the required reflectivity at 780 nm was achieved.

Measurement of a single component was made by coating the single component, such as a dye, as described above. K was determined by spectroscopic ellipsometric analysis also as described above. In some cases, a dye would crystallize preventing measurement. In the case of the metal formazans, we were able to measure k for all the dyes except for LF-6. Since the other dyes in this class are similar in structure to LF-6, and LF-6 performed similarly in optical recording elements to the dyes for which k measurements were obtained, it is assumed that it has a low k value as well.

The following examples demonstrate the light and incubation stability of the optical recording layer used in the elements of this invention.

For each of the dye mixtures studied, an optical recording element was prepared by first dissolving the dye mixture in an appropriate solvent. The solvent mixture was MP/TCE [1-methoxy-2-propanol and 2,2,2-trichloroethanol (97:3)] unless otherwise stipulated. The solution was spin coated onto a 200 nm deep grooved polycarbonate substrate using methods well known to those skilled in the spin coating art. A complete recording element was prepared by applying 70 to 100 nm of gold to the dye film by sputtering and the gold layer was overcoated with 5 microns of a photocrosslinkable lacquer (Daicure SD-17). The element was tested by recording an EFM pattern using a commercially available media tester (MT-16 from Philips NV) and the pattern read back on a CD-CATS reader (commercially available from Audio Development Informationsteknik AB Sweden).

The light stability of the coated dye mixtures in optical recording elements was evaluated in some examples by preparing appropriate mixtures of low k formazans with a mixture of symmetrical and unsymmetrical cyanine dyes. The mixture was dissolved in 2,2,3,3-tetrafluoro-1-propanol at 2% solids and spun coated on 2"×2" pieces of polycarbonate at 600 rpm. After drying, the spectra of the resulting recording layers was measured and the absorbance at the wavelength corresponding to that of maximum absorbance of CD-1 (714 nm) was recorded. The recording layers were then exposed to a 50 Klux high intensity daylight source for periods extending to 14 days, the absorbance loss (at 714 nm) noted after each increment of exposure. In control compositions containing only CD-1 (no formazan dyes) the loss was 100 percent after three days exposure.

The criteria for incubational stability (2 weeks at 80° C./85% RH) and light stability (5 days of 50 Klux light exposure) are that contrast (I11R) not drop by more than 0.05 after 2 weeks incubation, that reflectivity not drop

9 below 65%, that symmetry not increase or decrease by more than 10 units, and that BLER not rise above 50. BLER is error rate.

Comparative example 1

An optical recording dement was formed with a mixture containing 4 parts of CD-1, 2 parts CD-2 (a low k symmetrical cyanine dye) and 4 parts of LF-3 dissolved in a mixture of 1-methoxy-2-propanol and 4-hydroxy-4-methyl-2-pentanone which was coated on a 200 nm grooved polycarbonate substrate. The element was tested as described above and found to be incubationally unstable.

EXAMPLE 1

An optical recording element was formed with a mixture containing 4 parts of CD-1, 2 parts U-1(a low k unsymmetrical cyanine dye) and 4 parts of LF-3 dissolved in a mixture of 1-methoxy-2-propanol and 4-hydroxy-4-methyl-2-pentanone coated on a 200 nm deep grooved polycarbonate substrate. The element was tested as described above and found to be both incubationally stable and light stable.

EXAMPLE 2

An optical recording element was formed with a mixture containing 4 parts of CD-1, 2 parts U-2 and 4 parts of LF-3 dissolved in a mixture of 1-methoxy-2-propanol and 4-hydroxy-4-methyl-2-pentanone and coated on a 200 nm deep grooved polycarbonate substrate. The element was tested as described above and found to be both incubationally stable and light stable.

This invention has been described with particular reference to preferred embodiments thereof but it will be understood that modifications can be made within the spirit and scope of the invention.

What is claimed is:

1. An optical recording element having a transparent substrate and on the surface of said substrate, a recording layer and a light reflecting layer wherein recording layer comprises a mixture of (a) metallized formazan dye and (b) a mixture of cyanine dyes, and the unrecorded layer is such that the real part of the refractive at 780 nm is greater than 1.8 and the imaginary part is less than 0.15 wherein the metallized formazan dye has a k value of 0.03 to 0.07 and the mixture of cyanine dyes is a mixture of symmetrical and unsymmetrical cyanine dyes.

2. The optical element of claim 1 wherein the metallized formazan dye has the structure I as follows:

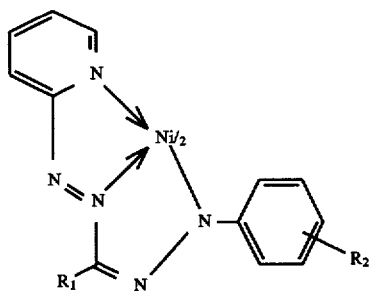

I wherein
$R_1$ represents alkyl of 1–12 carbons, or alkyl substituted with one or more groups selected from the group consisting of hydroxy, acyloxy, alkoxy, aryloxy, alkylthio, arylthio, alkylsulfonyl, arylsulfonyl, thiocyano, cyano, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, trihalomethyl, alkyl, heteroaryl, alkylureido, arylureido, succinimido and phthalimido; or aryl, or alkyl substituted aryl or alkoxy substituted aryl;

$R_2$ represents sulfonyl morpholine, sulfonamide, halogen, cyano, alkoxycarbonyl or alkyl sulfonyl.

3. The optical element of claim 2 wherein the metallized formazan dye has a structure selected from table 1:

TABLE 1

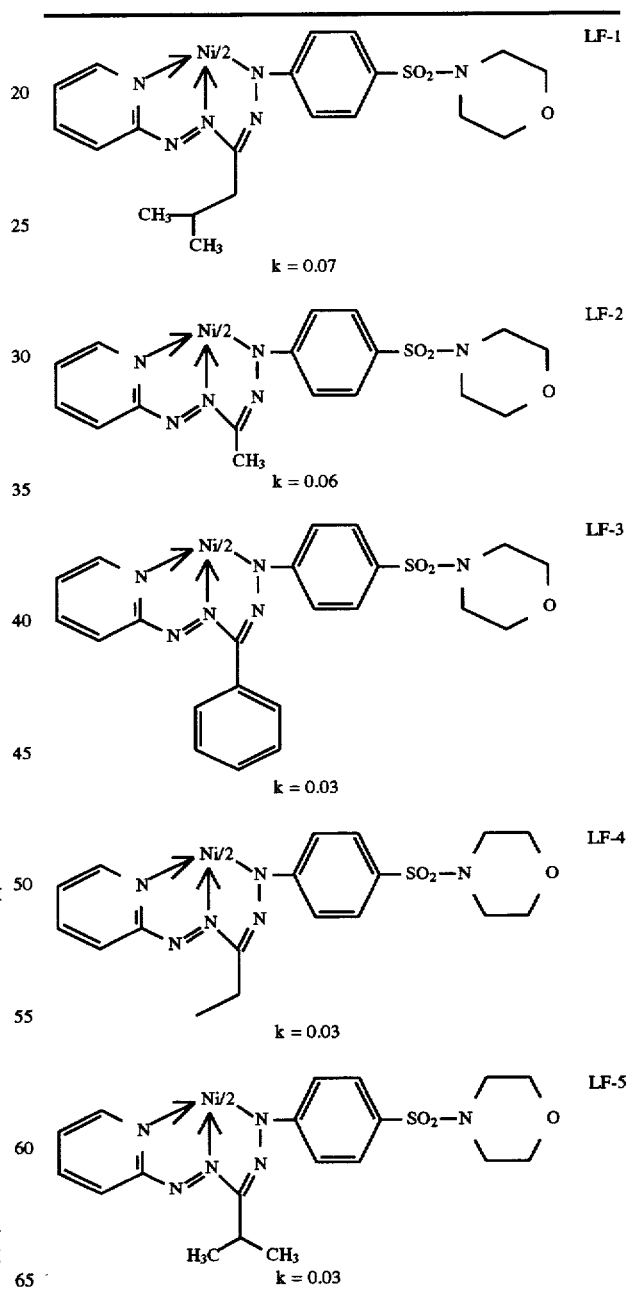

TABLE 1-continued

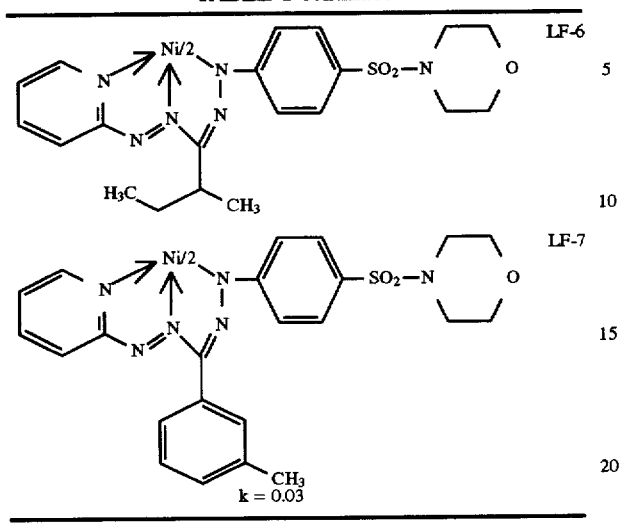

LF-6

LF-7

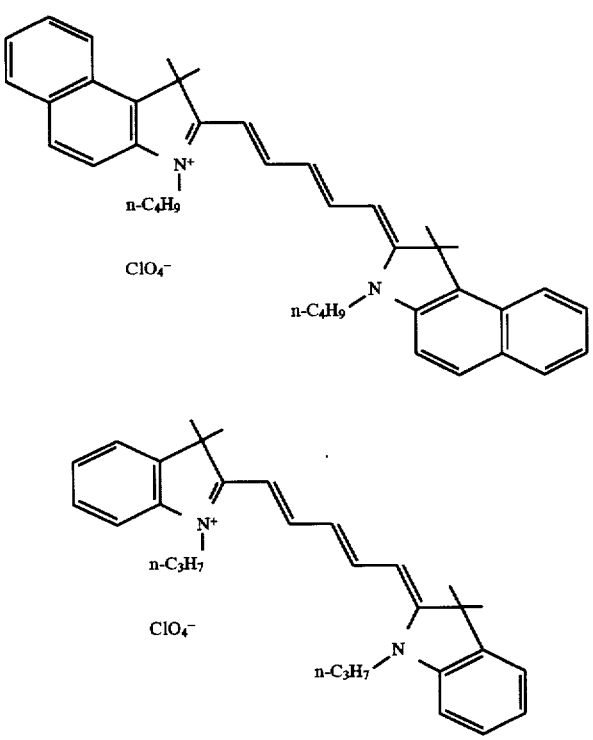

4. The element of claim 1 wherein the mixture of symmetrical and unsymmetrical cyanine dye is selected from the class of indodicarbocyanine dyes.

5. The element of claim 4 wherein the symmetrical and unsymmetrical cyanine dyes are selected from those according to structures II and III respectively:

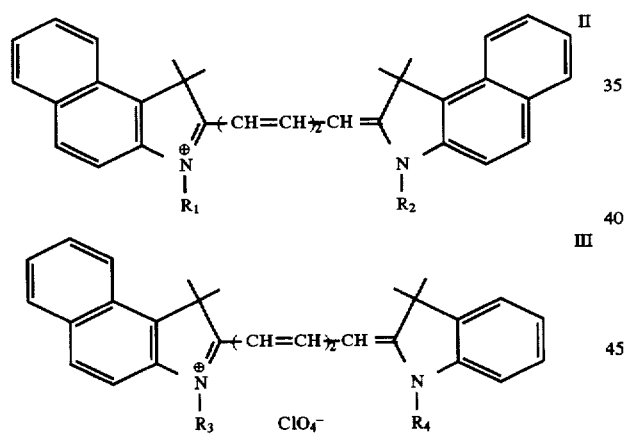

wherein $R_1$, $R_2$, $R_3$ and $R_4$ represents substituted and unsubstituted alkyl of 1–12 carbon atoms, wherein substituents are selected from the group consisting of hydroxy, acyloxy, alkoxy, aryloxy, alkylthio, arylthio, alkylsulfonyl, arylsulfonyl, thiocyano, cyano, nitro, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, trihalomethyl, alkyl, aryl, heteroaryl, alkylureido, arylureido, succinimido and phthalimido; and X is $ClO_4$ or $BF_4$.

6. The element according to claims claim 5 wherein the symmetrical cyanine dye is selected from the group consisting of

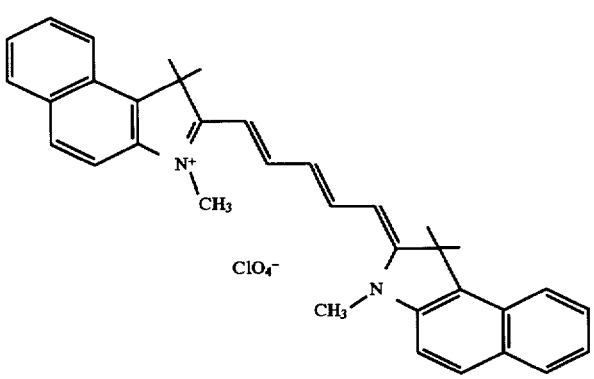

and

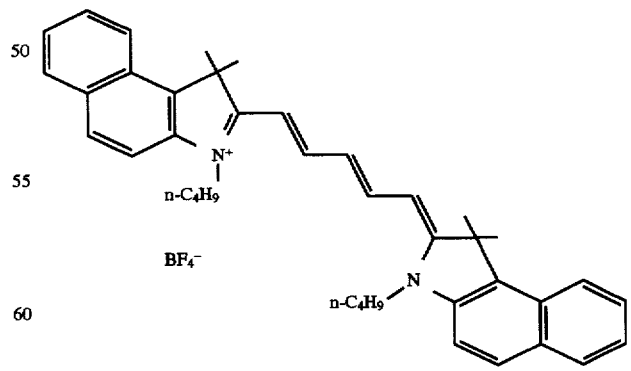

7. The element of claim 5 wherein the unsymmetrical cyanine dye has a structure selected from table 2 as follows:

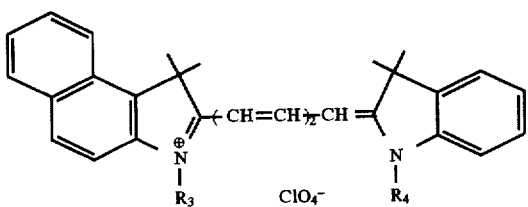

TABLE 2

| Unsymmetrical Dye No. | $R_3$ | $R_4$ |
|---|---|---|
| U-1 k = 0.02 | n-$C_4H_9$ | —$CH_3$ |
| U-2 k = 0.02 | n-$C_4H_9$ | n-$C_3H_7$ |
| U-3 | n-$C_4H_9$ | n-$C_4H_9$ |

8. The element of claim 7 wherein the unsymmetrical dye is U-2 of Table 2.

9. The dement of claim 1 wherein the symmetrical cyanine dye is

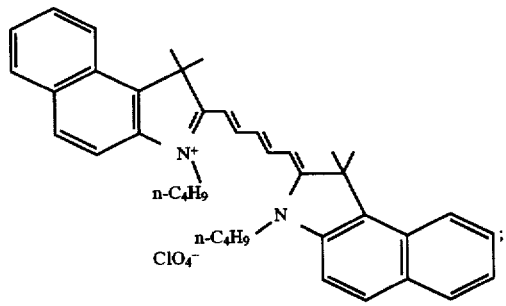

and the unsymmetrical cyanine dyes is selected from table 2 as follows:

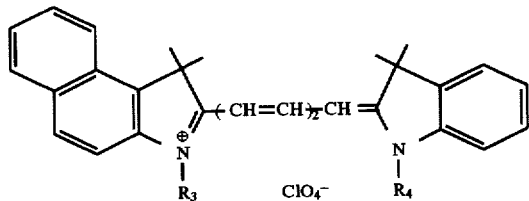

TABLE 2

| Unsymmetrical Dye No. | $R_3$ | $R_4$ |
|---|---|---|
| U-1 k = 0.02 | n-$C_4H_9$ | —$CH_3$ |
| U-2 k = 0.02 | n-$C_4H_9$ | n-$C_3H_7$ |
| U-3 | n-$C_4H_9$ | n-$C_4H_9$ |

10. The element of claim 9 wherein the unsymmetrical cyanine dye is dye U-1 from table 2.

11. The element of claim 1 wherein the total cyanine dye to metallized formazan dye ratio is 6:4.

12. A mixture of (a) metallized formazan dye and (b) a mixture of cyanine dyes wherein the metallized formazan dye has an imaginary k value of 0.03 to 0.07 and the mixture of cyanine dyes is a mixture of symmetrical and unsymmetrical cyanine dyes.

13. The mixture of claim 12 wherein the metallized formazan dye has the structure I as follows:

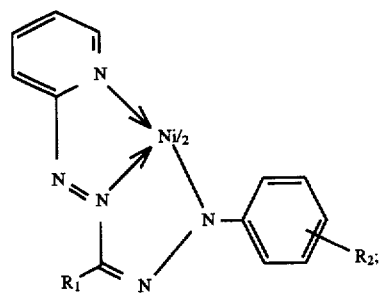

wherein $R_1$ represents alkyl of 1-12 carbons, or alkyl substituted with one or more groups selected from the group consisting of hydroxy, acyloxy, alkoxy, aryloxy, alkylthio, arylthio, alkylsulfonyl, arylsulfonyl, thiocyano, cyano, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, trihalomethyl, alkyl, heteroaryl, alkylureido, arylureido, succinimido and phthalimido; or aryl, or alkyl substituted aryl or alkoxy substituted aryl;

$R_2$ represents sulfonyl morpholine, sulfonamide, halogen, cyano, alkoxycarbonyl or alkyl sulfonyl.

14. The mixture of claim 13 wherein the metallized formazan dye has a structure selected from table 1:

TABLE 1

[Structures LF-1, LF-2, LF-3 with k = 0.07, k = 0.06, k = 0.03 respectively]

TABLE 1-continued

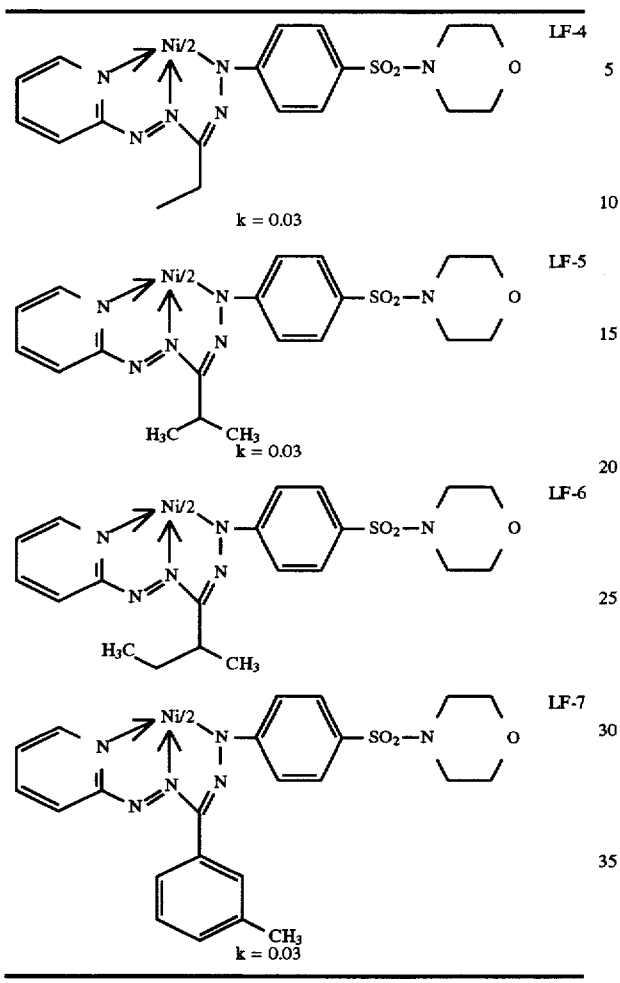

15. The mixture of claim 13 wherein the mixture of symmetrical and unsymmetrical cyanine dye is selected from the class of indodicarbocyanine dyes.

16. The mixture of claim 15 wherein the symmetrical and unsymmetrical cyanine dyes are selected from those according to structures II and III respectively:

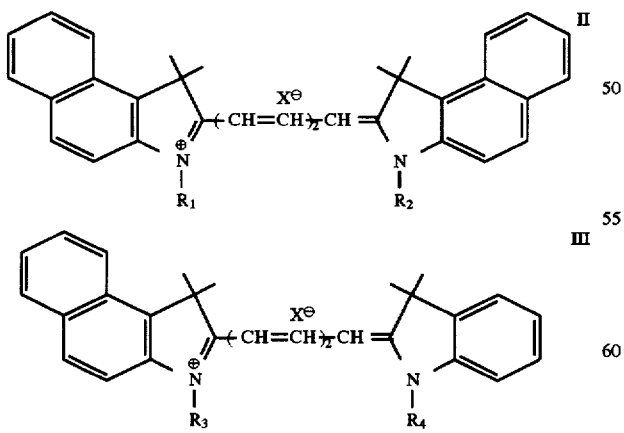

wherein
$R_1$, $R_2$, $R_3$ and $R_4$ represents substituted and unsubstituted alkyl of 1–12 carbon atoms, wherein substituents are selected from the group consisting of hydroxy, acyloxy, alkoxy, aryloxy, alkylthio, arylthio, alkylsulfonyl, arylsulfonyl, thiocyano, cyano, nitro, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, sulfo, trihalomethyl, alkyl, aryl, heteroaryl, alkylureido, arylureido, succinimido and phthalimido; and x is $ClO_4$ or $BF_4$.

17. The mixture according to claim 16 wherein the symmetrical cyanine dye is selected from the group consisting of

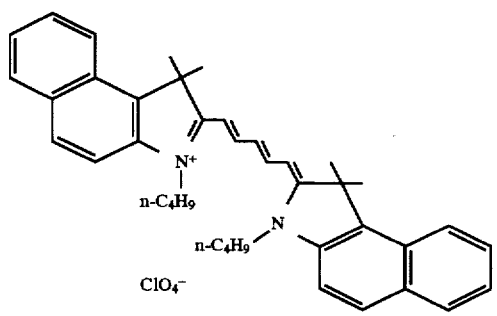

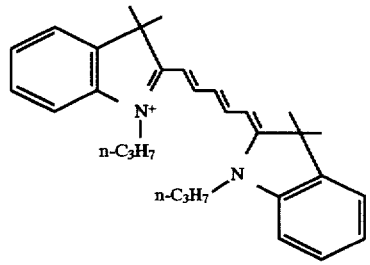

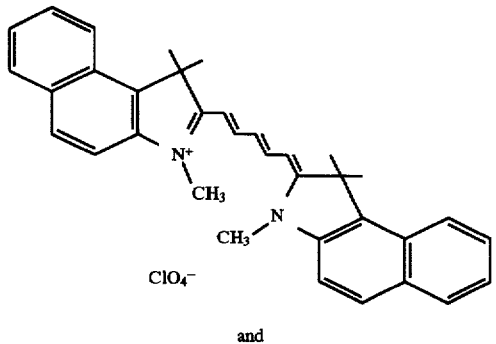

and

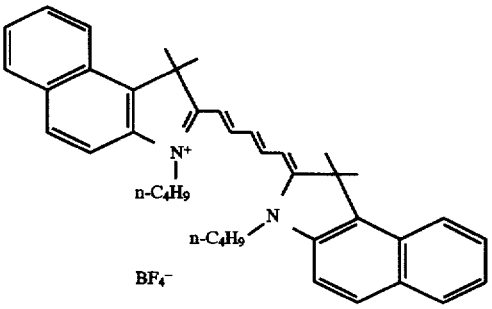

18. The mixture of claim 17 wherein the symmetrical cyanine dye has the structure

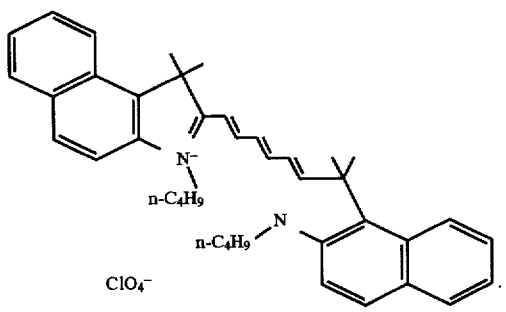

19. The mixture of claim 16 wherein the unsymmetrical cyanine dye has a structure selected from table 2 as follows:

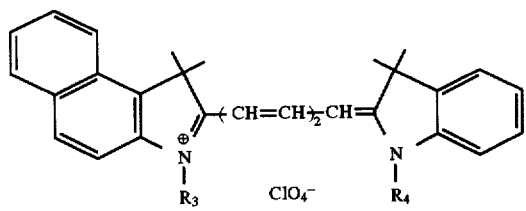

TABLE 2

| Unsymmetrical Dye No. | $R_3$ | $R_4$ |
|---|---|---|
| U-1 k = 0.02 | n-$C_4H_9$ | —$CH_3$ |
| U-2 k = 0.02 | n-$C_4H_9$ | n-$C_3H_7$ |
| U-3 | n-$C_4H_9$ | n-$C_4H_9$ |

20. The mixture of claim 19 wherein the unsymmetrical dye is U-2 of Table 2.

21. The mixture of claim 16 wherein the symmetrical cyanine dye is

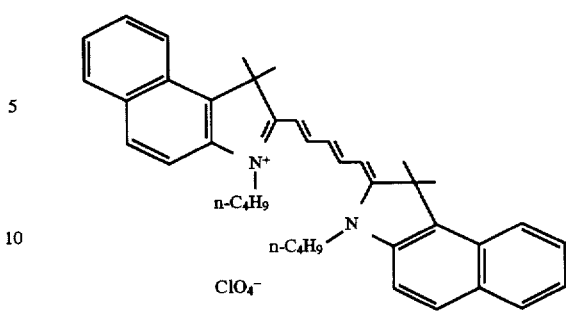

and the unsymmetrical cyanine dye is selected from table 2 as follows:

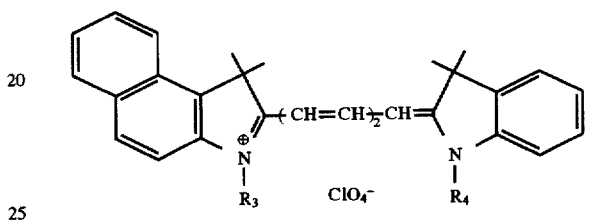

TABLE 2

| Unsymmetrical Dye No. | $R_3$ | $R_4$ |
|---|---|---|
| U-1 | n-$C_4H_9$ | —$CH_3$ |
| U-2 | n-$C_4H_9$ | n-$C_3H_7$ |
| U-3 | n-$C_4H_9$ | n-$C_4H_9$ |

22. The mixture of claim 21 wherein the unsymmetrical cyanine dye is dye U-1 from table 2.

23. The mixture of claim 21 wherein the total cyanine dye to metallized formazan dye ratio is 6:4.

* * * * *